United States Patent [19]

Koppers et al.

[11] Patent Number: 4,610,424
[45] Date of Patent: Sep. 9, 1986

[54] SHUT-OFF VALVE

[75] Inventors: Manfred Koppers, Duisburg; Karlheinz Bohnes, Bochum; Kuno Guse, Dortmund; Friedel Amling, Gelsenkirchen-Horst, all of Fed. Rep. of Germany

[73] Assignee: Bochumer Eisenhuette Heintzmann GmbH & Co Kg, Bochum, Fed. Rep. of Germany

[21] Appl. No.: 674,834

[22] Filed: Nov. 26, 1984

[30] Foreign Application Priority Data

Nov. 24, 1983 [DE] Fed. Rep. of Germany ....... 3342405

[51] Int. Cl.$^4$ .......................... F16K 47/04; F16K 1/38
[52] U.S. Cl. .................................... 251/121; 251/123; 251/333
[58] Field of Search ............... 251/121, 122, 210, 123, 251/118, 333

[56] References Cited

U.S. PATENT DOCUMENTS

| 1,619,278 | 3/1927 | Travis | 251/122 X |
| 2,091,042 | 8/1937 | Hedges | 251/118 X |
| 3,180,360 | 4/1965 | Pavlin | 251/118 X |
| 3,703,273 | 11/1972 | Illing | 251/122 |

FOREIGN PATENT DOCUMENTS

| 60003 | 7/1942 | Denmark | 251/210 |
| 1526993 | 7/1969 | Fed. Rep. of Germany | 251/118 |
| 1385008 | 2/1975 | United Kingdom | . |

OTHER PUBLICATIONS

Instrum. & Exp. Tech. (U.S.A.), vol. 16, No. 4, p. 2, (Jul.-Aug. 1973), "Locking Valve", By Plotnikov and Kurshin.

Primary Examiner—Arnold Rosenthal
Attorney, Agent, or Firm—Michael J. Striker

[57] ABSTRACT

A shut-off valve has a sealing cone which in a closed position of the valve abuts against a conical sealing seat and is formed as a part of a cylindrical throttling piston, a sealing surface of the sealing seat cooperates at its one end with a cylindrical receiving opening for the throttling piston, and the outer diameter of the throttling piston is selected with respect to the inner diameter of the receiving opening so that a throttling gap is formed between the receiving opening and the the throttling piston.

6 Claims, 5 Drawing Figures

SHUT-OFF VALVE

BACKGROUND OF THE INVENTION

The present invention relates to a shut-off valve with a great turn-on time for fluids under high pressure.

Under high pressure, high pressure above 1,000 bar is understood. With such pressures sealing cones and sealing seats are always made of metal. The sealing seat is composed as a rule of a more or less sharp edge at the mouth of a valve housing bore hole. The sealing cone is pressed against it and thereby the required sealing action is obtained. The working fluid is water, mixed in some cases with additives.

In such valves, the indifferent conditions, especially with a valve which is always slightly open or in other words, with a small gap between the sealing cone and the sealing seat, lead fast to destruction of the sealing seat. The extrordinary high flow speed of rhe fluid in the sealing gap which takes place at a pressure above 1,000 bar, cause cavitation and material errosion. For unloading the sealing seat and obtaining a high actuation frequency (great turn-on time) it is advantageous to open the valve as fast as possible and to close it as fast as possible. These features lead, however, to enormously high pressure peaks in the hydraulic system in which the shut-off valve is incorporated. These pressure peaks lead to breakage in the pipe and hose conduits of the hydralic system.

SUMMARY OF THE INVENTION

Accordingly, it is an object of the present invention to provide a shut-off valve which avoids the disadvantages of the prior art.

More praticularly, it is an object of the present invention to provide a shut-off valve which is designed so that pressure peaks which are not avoidable during the operation are retained small and thereby no or only insignificant reaction onto the hydraulic system is caused.

In keeping with these objects and with others which will become apparent hereinafter, one feature of the present invention resides, briefly stated, in a shutt-off valve in which a sealing cone which in a closed position of the valve abuts against a conical sealing seat is formed as a part of a cylindrical throttling piston and a sealing surface of the sealing seat is associated at its end with a cylindrical receiving opening for the throttling piston, wherein by the respective dimensioning of the outer diameter of the throttling piston and the inner diameter of the receiving opening a throttling gap is formed within the receiving opening and the throttling piston.

Because of the formation of the throttling gap provided with the conical sealing seat in condition of insertion of the throttling piston into the receiving opening, in the critical situations shortly before the placement of the sealing cone onto the sealing surface as well as immediately after the lifting of the sealing cone from the sealing surface, an operative condition takes place in which approximately no fluid pressure in the region of the sealing surface is available. Thereby also the flow speed in the sealing gap is very small, so that the wear-causing action of the highly stressed fluid does not take place.

The length of the throttling gap must be dimensioned so that a sufficient pressure reduction with respective valve dimensions and fluid temperatures is obtainable.

The minimum length can be for example one-fifth of the diameter of the throttling piston.

The switching characteristic of such a valve is very weak, whereby an increase of the valve service life and a considerable lowering of the pressure peaks in the hydraulic system are obtained.

During the closing step a constantly elongating throtting gap is formed during introduction of the throttling piston into the receiving opening, in which the fluid stream is increasingly throttled. The high fluid pressure is reduced to approximately 0 bar. In the moment of placement of the sealing cone onto the sealing surface, no significant pressure and thereby no flow speed are present so that no cavitation or material erosion can be caused. Moreover, during the closing step the loads which acted in the region of the valve seat are displaced in the region of the throttling gap and particularly to a surface which is many times greater than the surface of the sealing seat.

During opening of the valve the fluid pressure available in the throttling gap up to the sealing surface collapses, since through the narrow throttling gap, no sufficient fluid can flow to maintain the pressure. During further outward movement of the throttling piston from the receiving opening and thereby shortened throttling gap, in other words, with the subsequent throttling action, the fluid pressure available at the valve inlet increases at the valve outlet.

The advantageous field of application of the inventive shut-off valve is high pressure water-supported cutting heads of the machines which are used in underground excavations for releasing coal or other minerals.

In accordance with another feature of the present invention an edge between the sealing cone and a cylindrical of the throttling piston is rounded. When the shut-off valve is designed in accordance with this feature, then in the moment of placement of the throttling piston on the sealing surface no unacceptably high material loads are produced which can lead otherwise to damage to the sealing surface.

In accordance with still a further feature of the present invention a cone angle of the sealing cone is smaller than a cone angle of the sealing surface. This provides for a definite linear support and thereby an unobjectionable sealing action. Only the rounded sealing edge comes to abutment against the sealing surface.

Yet another feature of the present invention is that a starting incline is provided at the mouth of the receiving opening. It facilitates unobjectionable introduction of the throttling piston during the closing step.

Finally, the sealing surface and the receiving opening are formed in an insert body which is supported by a circular seal in the valve housing. With these features the valve has a simple manufacture with low matching accuracy, since the insert body moves radially and thereby can be exactly adjusted relative to the throttling body.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 2:
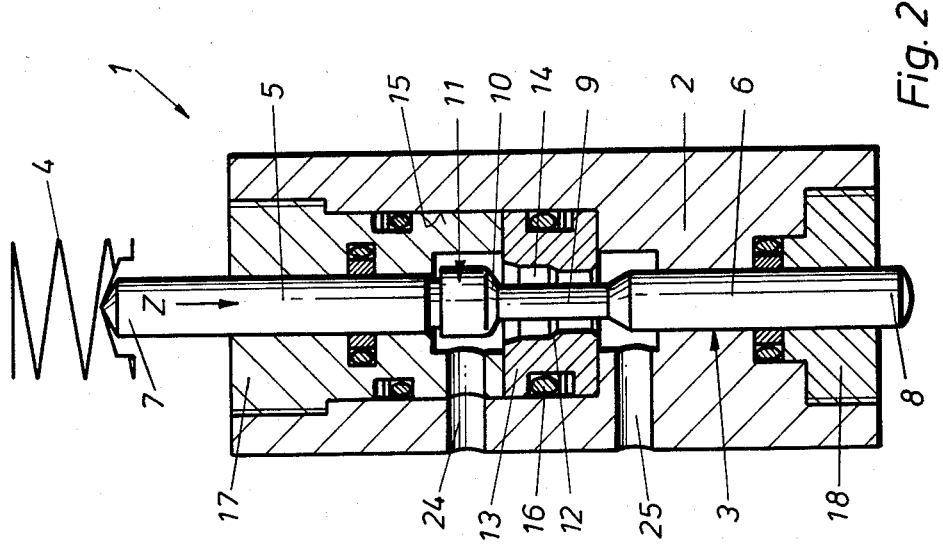
FIG. 2 is a view substantially corresponding to the view of FIG. 1, but showing the inventive shut-off valce in an open position.
Figure 1:
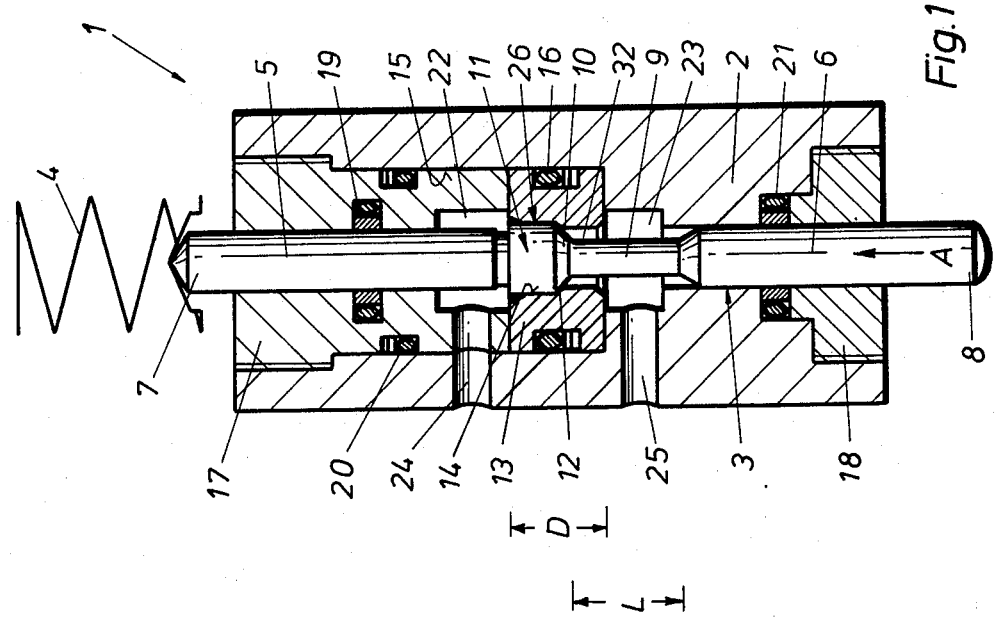
FIG. 1 is a view showing a longitudinal section of a shut-off valve in accordance with the present invention in a closed position.

A shut-off valve identified with reference numeral 1 and shown in FIGS. 1 and 2 forms a part of an hydraulic system with the fluid pressure over 1,000 bar. Water with additives can be used as the fluid in the system in some cases.

The valve has a housing 2 and an actuating plunger 3 which extends through the valve housing 2 in a longitudinal direction and is loaded by a pressure spring 4 in direction toward a closing position shown in FIG. 1. The actuating plunger 3 has two cylindrical guiding portions 5 and 6 which extend with their ends 7 and 8 beyond the respective ends of the valve housing 2. The actuating plunger 3 has in its central longitudinal region a narrow portion 9. A sealing cone 10 is provided immediately after the narrow portion 9 in direction towards the guiding portion 5 an is formed as an end part of a cylindrical throttling piston 11.

The sealing cone 10 cooperates with a conical sealing surface 12 of an insert body 13. The sealing surface 12 is associated at its end with a cylindrical receiving opening 14 provided in the insert body 13 for the throttling piston 11. The insert body 13 is inserted in a recess 15 of the valve housing 2. A sealing ring 16 provides radial support against the valve housing 2. The axial position is secured by a threaded member 17 which serves for bearing the guiding portion 5. The other guiding portion 6 is supported partially directly in the valve housing 2 and partially in a threaded bush 18. A sealing ring 19 is arranged between the guiding portion 5 and the threaded member 17. A sealing ring 20 is arranged between the threaded member 17 and the valve housing 2 and a sealing ring 21 is arranged between the guiding portion 6, the valve housing 2, and the threaded bush 18.

Fluid chambers 22 and 23 are provided at both sides of the insert body 13. They are connected with a valve input 24 and a valve output 25, respectively.

Figure 3:
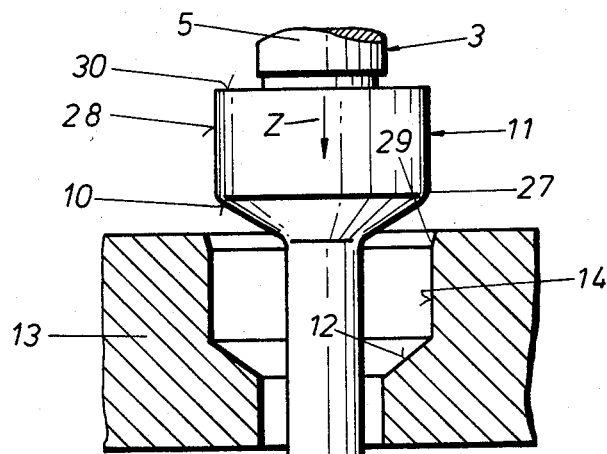
FIGS. 3–5 are views showing the region of a valve seat of the inventive shut-off valve in three different switching situations and on an enlarged scale.
Figure 4:
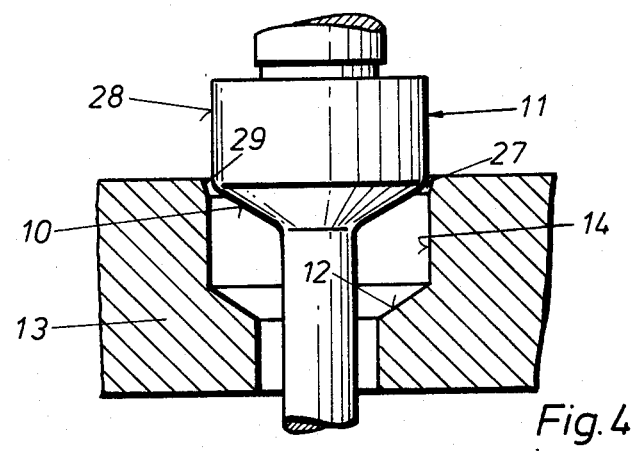
Figure 5:
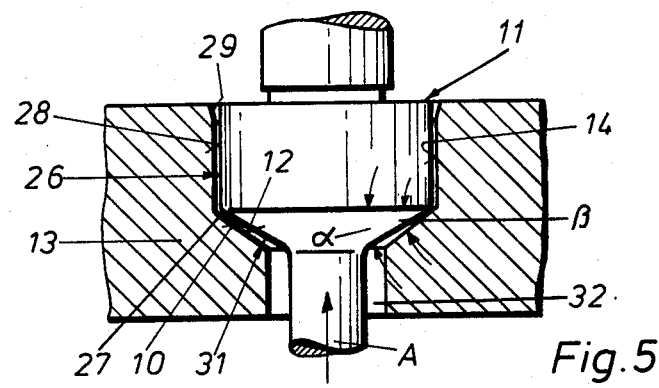

FIGS. 3–5 show that by respective dimensioning of the outer diameter of the throttling piston 11 relative to the inner diameter of the receiving opening 14, a throttling gap 26 is formed between the receiving opening 14 and the throttling piston 11. It can further be seen that an edge 27 between the sealing cone 10 and a cylindrical surface 28 of the throttling piston 11 is rounded. It can particularly be seen from FIG. 5 that the cone angle of the sealing cone 10 is smaller than the cone angle of the sealing surface 12. A mouth edge 29 of the receiving opening 14 in the insert body 13 is formed as a starting incline. The angle of the starting incline can amount to between 5° and 45°.

The narrow portion 9 in FIG. 1 has a length L which is dimensioned relative to the thickness D of the insert body 13 so that the through-flow cross-section in each position of the actuating plunger 3 is sufficiently great.

The operation of the shut-off valve in accordance with the present invention is as follows:

Closing step:

With the open valve 1 shown in FIGS. 2 and 3, the actuating plunger 3 at first is moved only under the action of the spring 4 in direction of the arrow Z. During further displacement, in addition an accelerative force acts on the actuating plunger 3, an its value is multiplied from the value of the annular surface 30 on the throttling piston 11 with the respective difference of the pressure which takes place on the valve input 24 and the valve output 25. The value of the annular surface 30 is obtained by subtraction of the diameter of the throttling piston 11 and the guiding portion 5. The movement process is in addition supported by the pressure reduction which takes place in the valve output 25.

When the throttling piston 11 is introduced into the receiving opening 14 as shown in FIG. 4, a throttling gap 26 is formed between the throttling piston 11 and the receiving opening 14. The fluid stream from the valve input 24 to the valve output 25 is increasingly reduced and the fluid pressure is continuously decreased. When the throttling piston 11 reaches the closing position shown in FIG. 5, the throttling gap 26 has a length which corresponds substantially to one-fifth of the diameter of the throttling piston 11. Shortly before the placement of the sealing cone 10 of the sealing surface 12, the fluid pressure is reduced to approximately 0 bar, so that in the sealing gap 31 no substantial flow takes place, whereby also no cavitation and material erosion can take place.

Opening step:

During opening of the shutoff valve 1 as shown in FIGS. 1 and 5, first an outer force is applied on the actuating plunger 3 in direction of the arrow A. In the throttling gap 26 there is the fluid pressure to the conical sealing surface 12. In moment of the opening, the valve chamber 32 which is pressureless to this time point is connected at the end of the sealing cone 10 with the throttling gap 26 so that the pressure which takes place in the region of the sealing cone collapses. Thereby no more sufficient fluid can flow through the narrow throttling gap 26 to maintain the pressure. During the further opening movement of the throttling piston 11 in accordance with FIG. 4, the pressure which takes place in the valve input 24 increases in the periphery of the valve output 25 in which the length of the throttling gap 26 reduces.

It will be understood that each of the elements described above, or two or more together, may also find a useful application in other types of constructions differing from the types described above.

While the invention has been illustrated and described as embodied in a shutoff-valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A shut-off valve with high switch frequency for liquid fluids under high pressure, particularly high pressure water, comprising a valve housing provided with a sealing seat; an actuating plunger movable in said valve housing and having an axis and a sealing cone which is pressable under the action of a fluid pressure and a spring-loaded return force against said sealing seat of said valve housing; a cylindrical throttling piston; and a cylindrical receiving opening for said throttling piston, said sealing seat being formed as a conical sealing surface, said sealing cone being formed so that in a closing position of the valve it abuts against said conical sealing surface and forms a part of said cylindrical throttling piston, said sealing surface being associated at its end with said cylindrical receiving opening for said throttling piston, said throttling piston having an outer diameter and said receiving opening having an inner diameter dimensioned relative to one another so that a throttling gap is formed between said receiving opening and said throttling piston, said sealing cone having a first angle of inclination relative to a plane extending transversely to said axis, said sealing surface having a second angle of inclination relative to said plane, said first angle of inclination of said sealing cone being smaller than said second angle of inclination of said sealing surface.

2. A shut-off valve as defined in claim 1, wherein said throttling piston has a cylindrical surface arranged so that an edge is formed between said sealing cone and said cylindrical surface, said edge being rounded.

3. A shut-off valve as defined in claim 1, wherein said receiving opening has a mouth which is formed as a starting incline.

4. A shut-off valve as defined in claim 1; and further comprising an insert body supported in said valve housing, said sealing surface and said receiving opening being formed in said insert body.

5. A shut-off valve as defined in claim 4; and further comprising a seal arranged to support said insert body in said valve housing.

6. A shut-off valve as defined in claim 1, wherein said sealing cone of said plunger has an extension which extends outwardly of said valve housing.

* * * * *